[12] United States Patent
Wilson et al.

(10) Patent No.: US 8,225,587 B2
(45) Date of Patent: Jul. 24, 2012

(54) CONTROLLING GROOMER ASSEMBLY DEPTH PENETRATION

(75) Inventors: Kenneth R. Wilson, Stanley, NC (US); Jonathan Maturan, Charlotte, NC (US)

(73) Assignee: Textron Innovations Inc., Providence, RI (US)

(*) Notice: Subject to any disclaimer, the term of this patent is extended or adjusted under 35 U.S.C. 154(b) by 301 days.

(21) Appl. No.: 12/033,261

(22) Filed: Feb. 19, 2008

(65) Prior Publication Data

US 2008/0196373 A1    Aug. 21, 2008

Related U.S. Application Data

(60) Provisional application No. 60/890,728, filed on Feb. 20, 2007.

(51) Int. Cl.
*A01D 75/30* (2006.01)
(52) U.S. Cl. .................................. 56/7; 56/249
(58) Field of Classification Search ............... 56/10.2 R, 56/10.4, 10.2 D, 249, 251, 294, DIG. 20, 56/7
See application file for complete search history.

(56) References Cited

U.S. PATENT DOCUMENTS

| | | | | |
|---|---|---|---|---|
| 1,538,381 A * | 5/1925 | Bull | ................................ | 56/251 |
| 1,837,741 A * | 12/1931 | Wenrich | ........................... | 56/251 |
| 3,423,919 A * | 1/1969 | Cook | .............................. | 56/249 |
| 3,453,814 A * | 7/1969 | Hanmer | ......................... | 56/249 |
| 3,628,318 A * | 12/1971 | Grobowski | ..................... | 56/249 |
| 3,783,592 A * | 1/1974 | Schraut | .......................... | 56/13.3 |
| 3,824,772 A * | 7/1974 | Sorenson et al. | .................. | 56/7 |
| 4,021,996 A * | 5/1977 | Bartlett et al. | ...................... | 56/7 |
| 4,481,757 A * | 11/1984 | Tsuchiya | ....................... | 56/16.9 |
| 4,841,717 A * | 6/1989 | Lloyd | ............................. | 56/256 |
| 4,878,340 A * | 11/1989 | Roy et al. | ......................... | 56/249 |
| 5,197,267 A * | 3/1993 | Aldred et al. | ................... | 56/249 |
| 5,228,277 A * | 7/1993 | Smith et al. | .................... | 56/16.9 |
| 5,634,325 A * | 6/1997 | Thorman et al. | .................... | 56/7 |
| 5,682,735 A * | 11/1997 | Swenson et al. | ................. | 56/249 |
| 7,441,392 B2 * | 10/2008 | Lilliestielke et al. | ........... | 56/15.9 |
| 7,631,479 B2 * | 12/2009 | Thier et al. | ...................... | 56/249 |
| 7,775,025 B1 | 8/2010 | Coffin et al. | | |
| 2010/0064651 A1 * | 3/2010 | Coleman et al. | ............... | 56/17.2 |

\* cited by examiner

*Primary Examiner* — Thomas B Will
*Assistant Examiner* — Mai Nguyen
(74) *Attorney, Agent, or Firm* — Harness, Dickey & Pierce, P.L.C.

(57) ABSTRACT

A turf cutting unit includes a reel assembly mounted to a frame and having a plurality of reel blades rotatable about a reel axis extending substantially parallel to the ground. A drivingly rotatable groomer includes a plurality of spaced apart and substantially vertically oriented cutting plates. An adjustment mechanism is operable to move the reel assembly relative to the turf to set a turf cutting height. The adjustment mechanism is operable to adjust the position of the cutting plates to set a depth of cut that the groomer cutting plates engage the turf. The adjustment mechanism limits a maximum depth of cut of the groomer cutting plates based on the cutting height of the reel assembly. A method of operating a turf cutting unit is also discussed.

8 Claims, 9 Drawing Sheets

CONTROLLING GROOMER ASSEMBLY DEPTH PENETRATION

CROSS-REFERENCE TO RELATED APPLICATIONS

This application claims the benefit of U.S. Provisional Application No. 60/890,728, filed on Aug. 20, 2007. The disclosure of the above application is incorporated herein by reference.

FIELD

The present disclosure relates to a grass cutting mower and, more particularly, to a cutting unit having a groomer with a height adjustment mechanism.

BACKGROUND

The statements in this section merely provide background information related to the present disclosure and may not constitute prior art.

Cutting units may be equipped with rotatable powered cutting reels and powered grooming reels or groomers useful to generate vertical grass growth and thicken the turf while cutting the grass. The groomer includes a plurality of vertically oriented and transversely spaced apart cutting blades. Each of the cutting blades includes a plurality of circumferentially spaced apart teeth. To properly stimulate growth of the turf, the depth of cut of the cutting blades of the groomer should be limited. In particular, it may be desirable to cut the runners and stolons of the turf to generate multiple growth points and subsequently thicken the turf. Furthermore, the groomer attempts to keep the grass growing in a vertical direction instead of a horizontal direction to improve the health, appearance and feel of the turf.

Unfortunately, some equipment operators attempt to use the groomer to verticut the turf. Verticutting differs greatly from grooming in that during verticutting the machine removes the runners and thatch to aerate the turf and provide passageways for water deeper into the turf. Verticutting typically kills a majority of the runners and stolons. Furthermore, the verticutting action requires substantially more power transfer to a set of vertically oriented blades to cut deeper into the turf and remove the runners and stolons than compared to grooming. Due to the aggressive nature of the verticutting action, this procedure is typically performed much less frequently than grass cutting and grooming. Accordingly, there may be a need for a mechanism to control the position of the groomer in relation to the position of the cutting reel to protect the turf from undesirable verticutting. Furthermore, such an adjustment mechanism may be beneficial to maintain the structural integrity of the lawn cutting and grooming apparatus.

SUMMARY

The present disclosure provides a turf cutting unit including a reel assembly mounted to a frame and having a plurality of reel blades rotatable about a reel axis extending substantially parallel to the ground. A drivingly rotatable groomer includes a plurality of spaced apart and substantially vertically oriented cutting plates. An adjustment mechanism is operable to move the reel assembly relative to the turf to set a turf cutting height. The adjustment mechanism is operable to adjust the position of the cutting plates to set a depth of cut that the groomer cutting plates engage the turf. The adjustment mechanism limits a maximum depth of cut of the groomer cutting plates based on the cutting height of the reel assembly.

A method of operating a turf cutting unit including a reel blade assembly and a groomer having cutting plates is also discussed. The method includes moving a first member relative to a second member to move the reel blade assembly relative to the turf and set a turf cutting height. Relative movement between the first and second members is restricted. A third member is moved relative to the first and second members to move the groomer and set a depth of cut of the cutting plates. An amount of relative movement between the third member and the second member is restricted to limit a magnitude of the depth of cut.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 1:
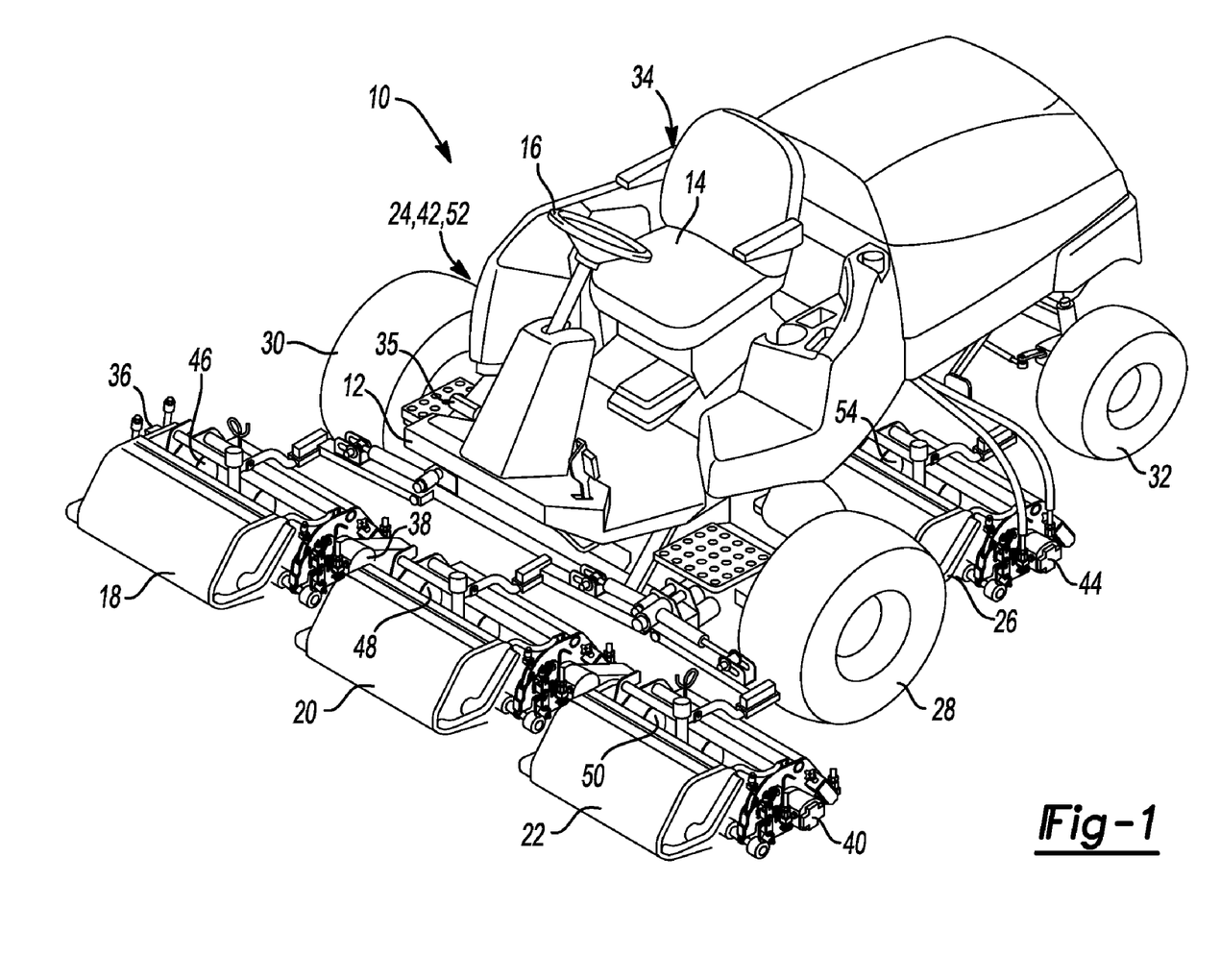
FIG. 1 is a perspective view of a riding mower equipped with a cutting unit having a moveable groomer.

FIG. 1 depicts a riding mower assembly 10 including a frame 12 supporting a seat 14 operable to support a passenger, a steering device 16 such as a steering wheel, and a plurality of cutting units 18, 20, 22, 24 and 26 (fourth cutting unit 24 is not clearly visible in this view). Front wheels 28, 30 and rear wheels 32, 34 are rotatably connected to frame 12 and used to propel or steer riding mower assembly 10. A power unit (not shown) is connected to and supported by frame 12. The power unit provides power to rotate one or more of the wheels 28, 30, 32, 34. In various embodiments, the power unit may supply power to electric motors to drive various wheels, may provide power to a hydraulic pump outputting pressurized hydraulic fluid, or may provide mechanical energy to otherwise directly or indirectly drive the various wheels. The pressurized hydraulic fluid operates hydraulic motors at the driven wheels. A speed control device 35, such as a foot controlled pedal, is provided to control a forward or reverse speed of mower assembly 10. While mower assembly 10 in described herein in various embodiments as a riding mower, one skilled in the art will recognize that other embodiments could include a walking mower, a stand-behind mower, and a riding mower.

The power unit is also coupled to a plurality of motors 36, 38, 40, 42, 44, each connected to one of the plurality of first through fifth cutting units 18, 20, 22, 24 and 26 (fourth motor 42 is not visible). In various embodiments, the power unit may provide electrical energy to electric motors or alternatively may provide pressurized hydraulic fluid to hydraulic motors to provide the rotating drive force to operate a plurality of first through fifth reel blade assemblies 46, 48, 50, 52, 54 rotatably mounted to individual first through fifth cutting units (fourth reel blade assembly 52 is not visible).

Figure 2:
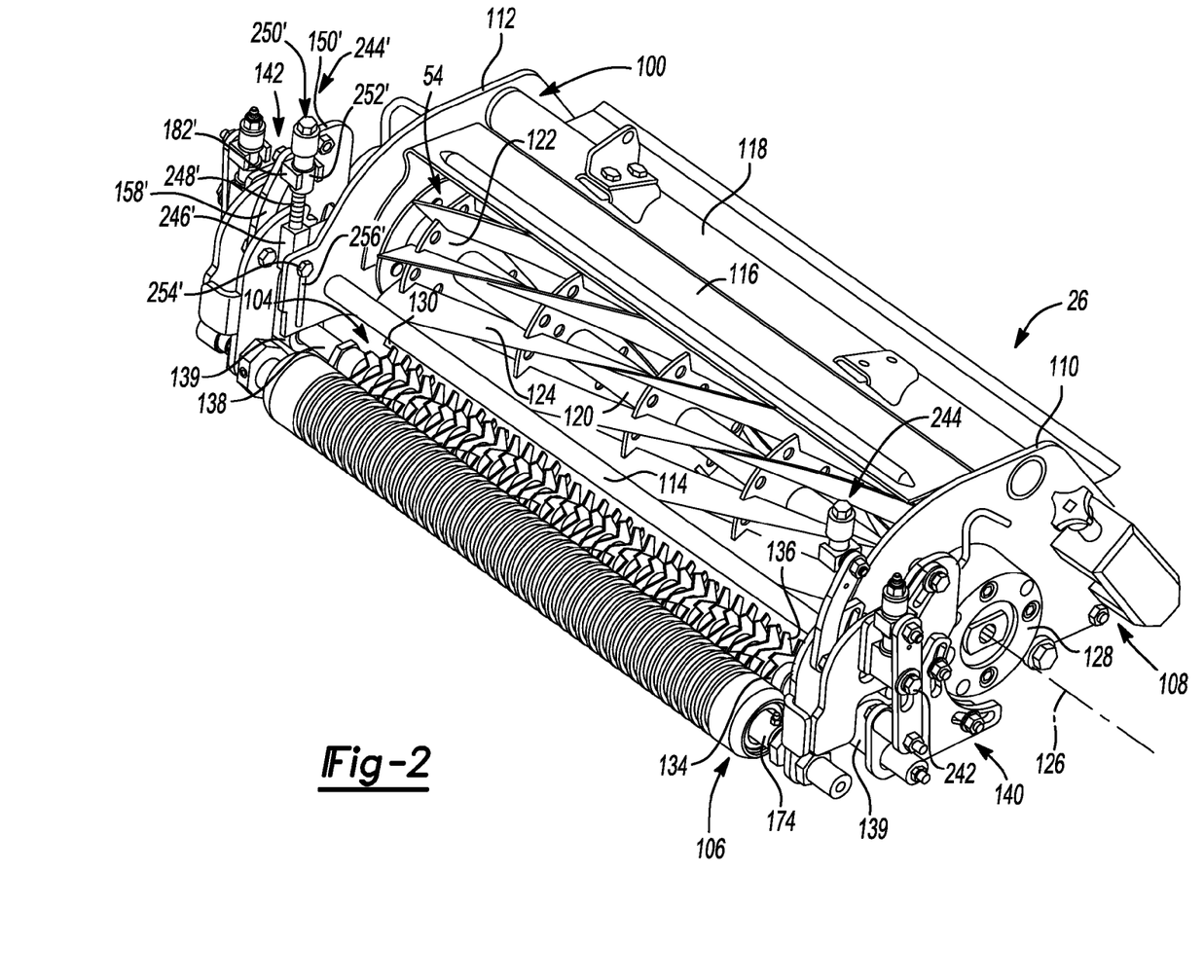
FIG. 2 is a perspective view of a cutting unit according to the teachings of the present disclosure.
Figure 3A:
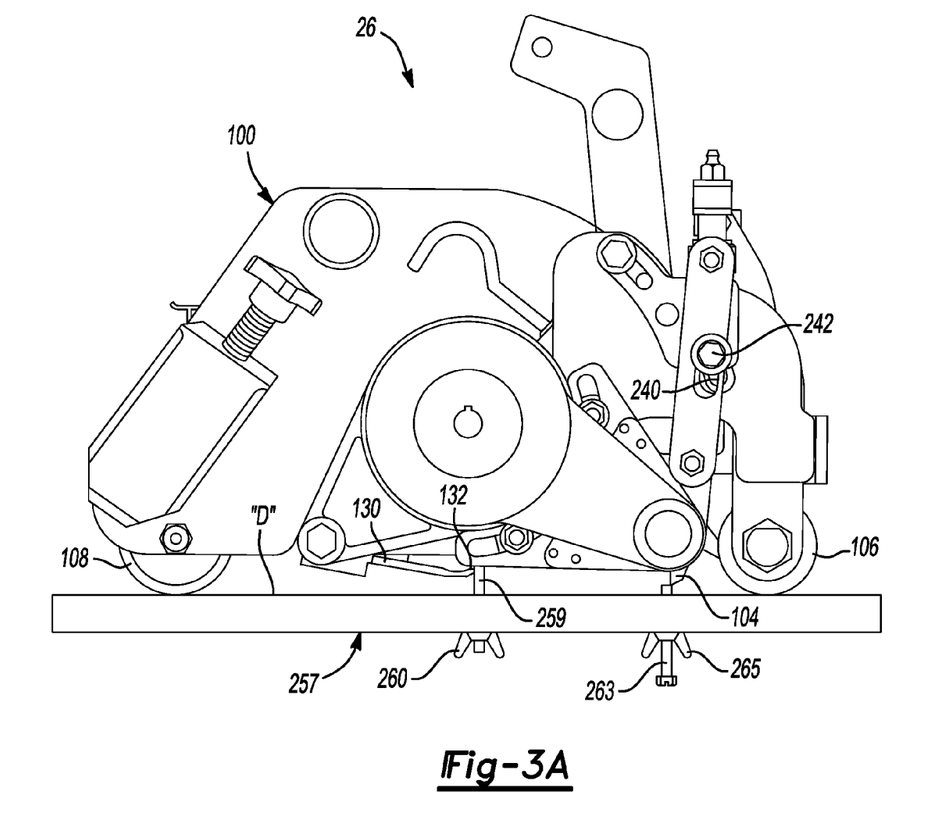
FIG. 3A is a side view of the cutting unit shown in FIG. 2.
Figure 4:
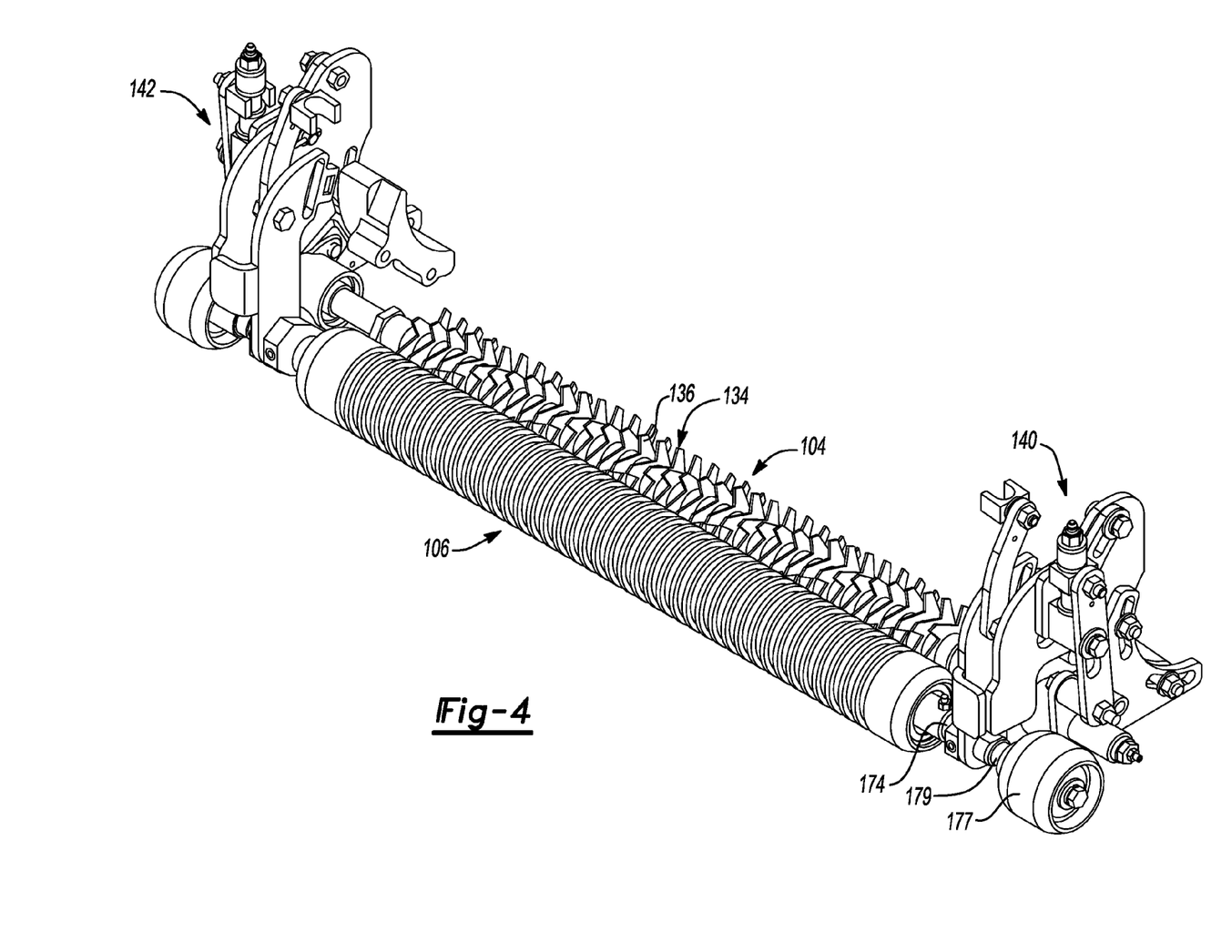
FIG. 4 is a partial perspective view of the cutting unit shown in FIG. 2.
Figure 5:
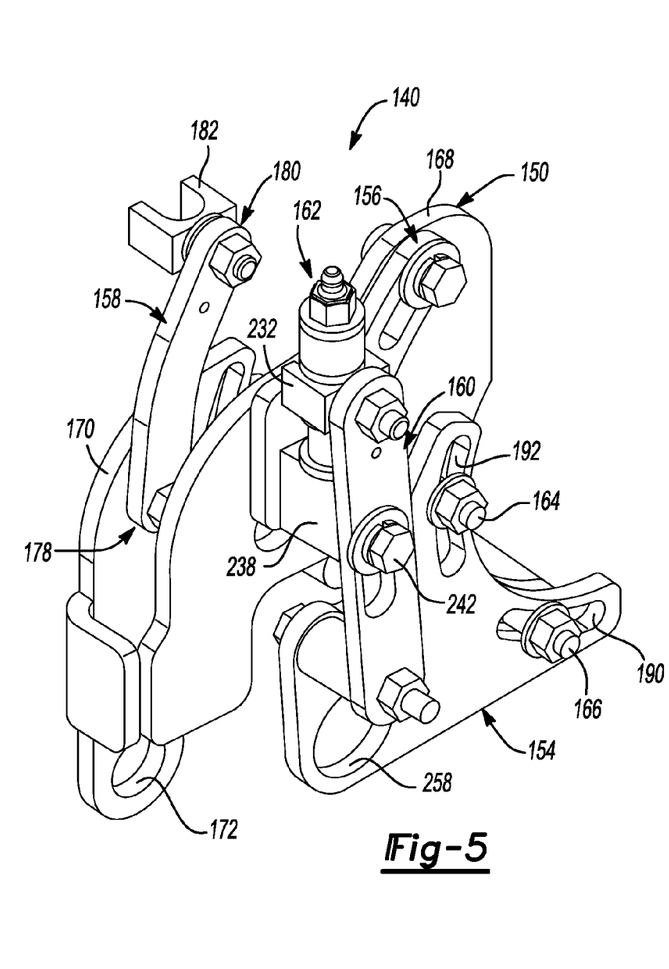
FIG. 5 is a perspective view of a left hand adjustment assembly of the cutting unit shown in FIG. 2.
Figure 6:
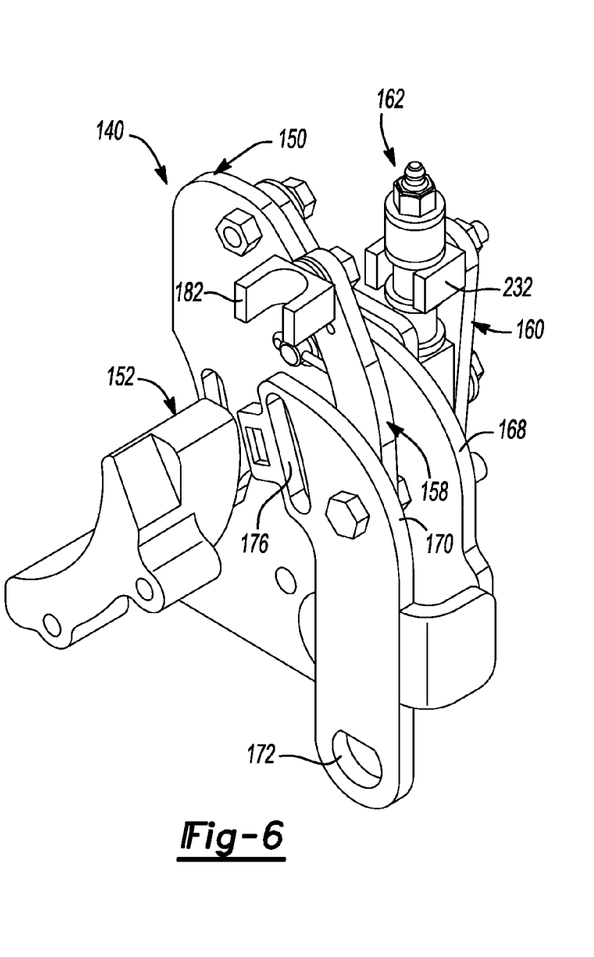
FIG. 6 is another perspective view of the adjustment assembly shown in FIG. 5.
Figure 7:
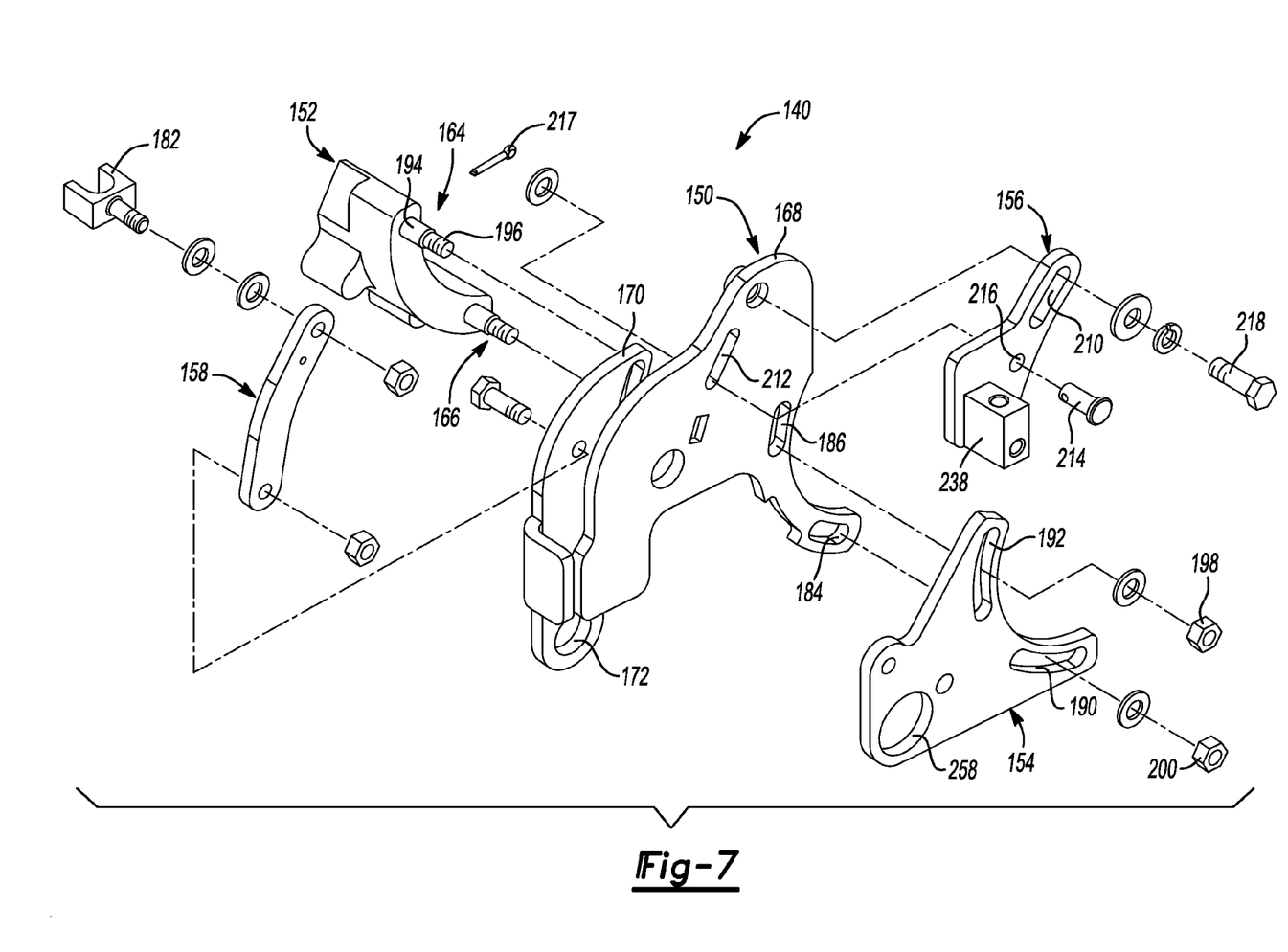
FIG. 7 is a partial exploded perspective view of the adjustment assembly shown in FIGS. 5 and 6.
Figure 8:
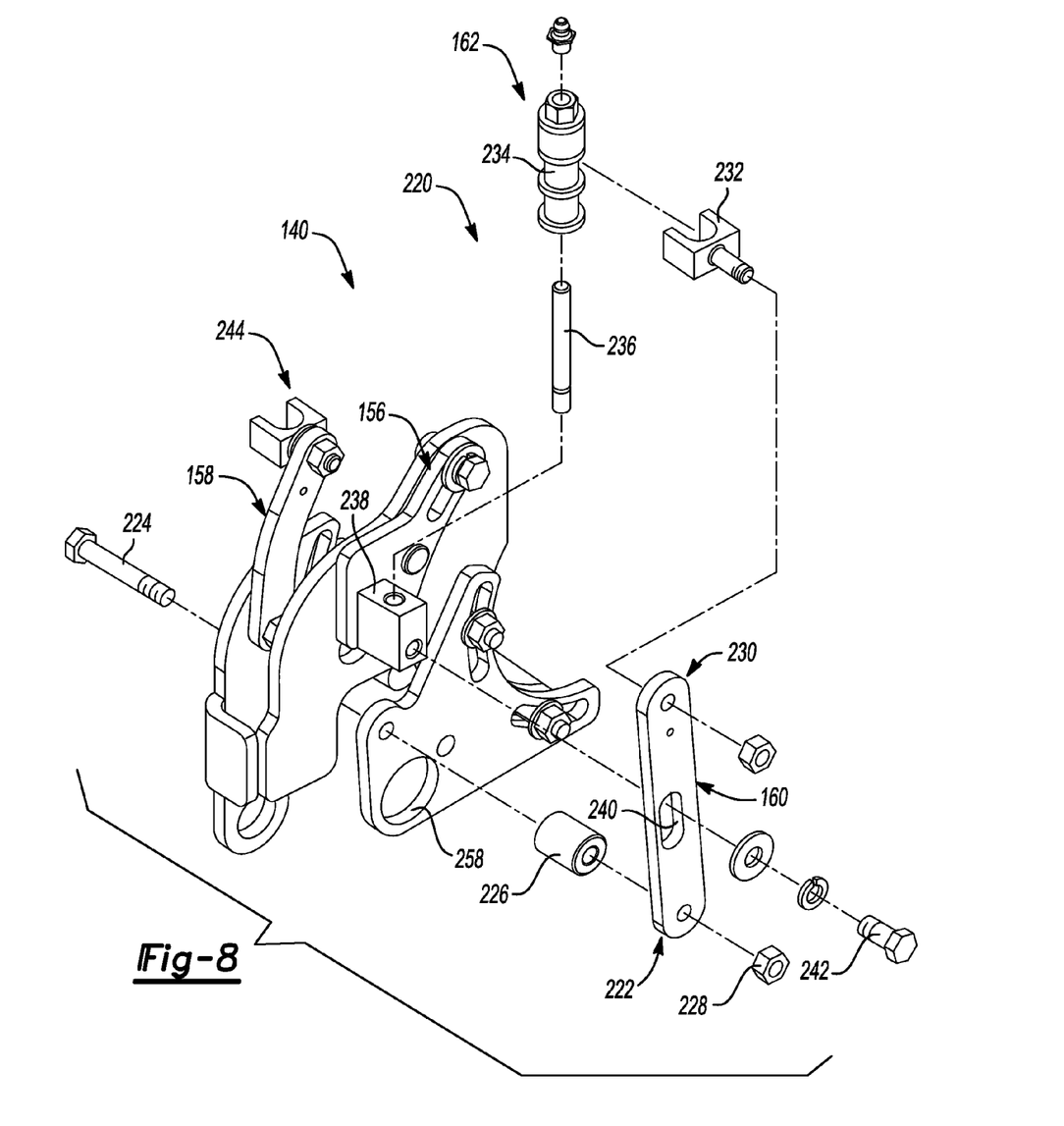
FIG. 8 is another partial exploded perspective view of the adjustment assembly shown in FIGS. 5-7.

FIGS. 2-4 depict cutting unit 26 in greater detail. Cutting unit 26 includes a reel housing 100 rotatably supporting cutting reel assembly 54, a groomer 104, a front roller 106 and a rear roller 108. Reel housing 100 includes a left plate 110 and a right plate 112 each being vertically oriented relative to the ground and positioned substantially parallel to one another. A first cross-member 114, a second cross-member 116 and a third cross-member 118 interconnect left plate 110 and right plate 112.

Reel assembly 54 includes a tube 120 and a plurality of substantially planar blade supports 122 spaced apart from one another and mounted to tube 120. A plurality of reel blades 124 are circumferentially spaced apart from one another and fixed to blade supports 122. Each reel blade 124 has a helical shape. Reel assembly 54 is rotatable about an axis 126. Hydraulic motor 44 is fixed to a hydraulic motor mount 128 and is operable to drive reel assembly 54 in rotation about axis 126. A bed knife 130 is coupled to reel housing 100. A cutting edge 132 of bed knife 130 is placed in close proximity to reel assembly 54 to perform a grass cutting operation.

Groomer 104 includes a plurality of cutting plates 134 vertically oriented relative to the ground and spaced apart from one another. Each cutting plate 134 includes a plurality of circumferentially spaced apart teeth 136. Teeth 136 are operable to cut runners and stolons of the turf to generate growth points and thicken the turf. Groomer 104 further functions to keep the grass growing in a vertical direction instead of a horizontal direction. Cutting plates 134 are fixed to a driveshaft 138. Bearing assemblies 139 rotatably support driveshaft 138. Driveshaft 138 is in driving communication with the power source as will be described in detail.

A left front adjustment assembly 140 operates in conjunction with a right front adjustment assembly 142 to rotatably support front roller 106 and groomer 104 on reel housing 100. Adjustment assemblies 140 and 142 are operable to set a cutting height for reel assembly 54. The position of groomer 104 may also be varied through the use of adjustment assemblies 140 and 142.

FIGS. 5 through 8 depict left front adjustment assembly 140 in greater detail. Left front adjustment assembly 140 is substantially the mirror image of right front adjustment assembly 142. Accordingly, only left front adjustment assembly 140 will be described. Adjustment assembly 140 includes a roller bracket 150, a spacer bracket 152, a groomer plate 154, a groomer adjustment bracket 156, a push plate 158, a link 160 and a groomer adjustment knob 162. Spacer bracket 152 is fixed to reel housing 100 to interconnect adjustment assembly 140 with left plate 110. A first stud 164 and a second stud 166 extend transversely from spacer bracket 152. First and second studs 164, 166 are positioned along an arc extending about reel assembly axis of rotation 126.

Roller bracket 150 includes an outboard plate 168 and an inboard plate 170 coupled to one another at their forward edges. Inboard plate 170 includes an aperture 172 in receipt of a front roller shaft 174 as well as a first slot 176. A guide roller 177 (FIG. 4) is rotatably supported on a stub shaft 179 coupled to roller bracket 150. Outboard plate 168 is spaced from and positioned substantially parallel to inboard plate 170. A gap formed between inboard plate 170 and outboard plate 168 is in receipt of push plate 158. Push plate 158 includes a first end 178 fixed to inboard plate 170 and a second end 180 having a yoke 182 fixed thereto.

Outboard plate 168 includes a third slot 184 and a fourth slot 186 extending along an arc drawn from reel assembly axis of rotation 126. In similar fashion, groomer plate 154 includes a fifth slot 190 and a sixth slot 192 extending at the same radius as third slot 184 and fourth slot 186. First stud 164 extends through fourth slot 186 and sixth slot 192. Second stud 166 extends through third slot 184 and fifth slot 190. It should be appreciated that first and second studs 164,166 are formed substantially similar to shoulder bolts having an enlarged shoulder 194 and a reduced diameter threaded portion 196. The outer diameter of shoulder portion 194 is sized to provide a slip fit between the slots formed in outboard plate 168. A first nut 198 is tightened to drive groomer plate 154 into contact with shoulder 194 of first stud 164. Similarly, a second nut 200 is tightened on second stud 166 to fix groomer plate 154 against shoulder 194 of second stud 166. At this time, spacer bracket 152 and groomer plate 154 may be rotated relative to roller bracket 150 about axis 126.

Groomer adjustment bracket 156 includes a seventh slot 210 and roller bracket 150 includes an eighth slot 212. A pin 214 extends through an aperture 216 formed in groomer adjustment bracket 156 and through eighth slot 212. Pin 214 is retained by a cotter pin 217. A threaded fastener 218 extends through seventh slot 210 and is secured in threaded engagement with a nut 219. Based on this arrangement, groomer adjustment bracket 156 is coupled to roller bracket 150 but remains free to rotate relative thereto.

A groomer position adjustment mechanism 220 includes link 160 having a first end 222 coupled to groomer plate 154 via a threaded fastener 224, a spacer 226 and a nut 228. A second opposite end 230 of link 160 is coupled to a yoke 232. Yoke 232 engages a land 234 formed on groomer adjustment knob 162. A stud 236 is threadingly engaged with a mounting block 238 fixed to groomer adjustment bracket 156. Groomer adjustment knob 162 is also threadingly engaged with stud 236 such that rotation of adjustment knob 162 axially displaces yoke 232. A ninth slot 240 is formed in link 160. A threaded fastener 242 extends through ninth slot 240 and is fixed to mounting block 238. Link 160 is allowed to move relative to block 238 to the extent possible based on the length of ninth slot 240.

A left hand reel cutting height adjustment mechanism 244 is best shown in FIG. 2. To best describe the cutting height mechanism, a right hand cutting height adjustment mechanism 244' will be described. As previously mentioned, right front adjustment assembly 142 is substantially a mirror image of left front adjustment assembly 140. Accordingly, like elements of the right front adjustment assembly will include a prime suffix designation. Cutting height adjustment mechanism 244' includes a block 246' having a threaded rod 248' extending therefrom. A cutting height adjustment knob 250' includes a land 252' engaged by yoke 182'. Rotation of adjustment knob 250' axially displaces yoke 182'. Yoke 182' is fixed to push plate 158'. Block 246' is adjustably fixed to right plate 112 via a threaded fastener 254'. Fastener 254' extends through a tenth slot 256' formed in right plate 112 and first slot 176' formed in roller bracket 150'.

To adjust the cutting height of reel assembly 54, fastener 254' and its corresponding fastener 254 on the opposite side of cutting unit 26 are loosened. At this time, rotation of adjustment knobs 250, 250' causes yokes 182, 182' to translate such that reel housing 100 moves relative to adjustment assemblies 140 and 142. This relative movement also causes relative movement between reel assembly 54 and the ground.

Figure 3B:
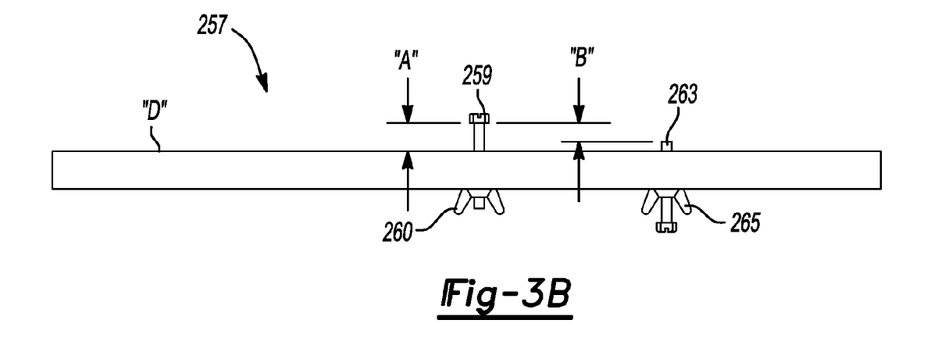
FIG. 3B is a side view of a height of cut and grooming depth gauge.

A gauge 257 is shown in FIGS. 3A and 3B to include a first threaded post 259 and a first nut 260. First post 259 and first nut 260 are moved relative to one another until the body of first post 259 extends above datum plate "D" a desired cutting height "A." First nut 260 is then tightened. Adjustment knobs 250, 250' are rotated until cutting edge 132 of bed knife 130 aligns with post 259. Once a desired cutting height is set, fastener 254' and its counterpart 254 are tightened.

To adjust the groomer position, an operator loosens fastener 242 and its corresponding fastener on right front adjustment assembly 142. First nut 198 and second nut 200 (FIG. 7) are also loosened to allow first stud 164 and second stud 166 to translate within fifth and sixth slots 190, 192. Groomer adjustment knob 162 is rotated until a desired grooming depth is reached. Gauge 257 also includes a second threaded post 263 and a second nut 265. Second post 263 is positioned to extend from datum "D" a distance varying from one-half of distance "A" to distance "A." Stated another way, a depth of groomer cut "B" ranges from zero to one-half to distance "A." Because it may be desirable to limit the depth of the groomer cut to be no greater than one-half of the height of cut, ninth slot 240 is elongated a distance to only allow this maximum groomer cut depth. Once a desired groomer position is set, fastener 242 and its counterpart are tightened. First nut 198 and second nut 200 are also tightened.

Figure 9:
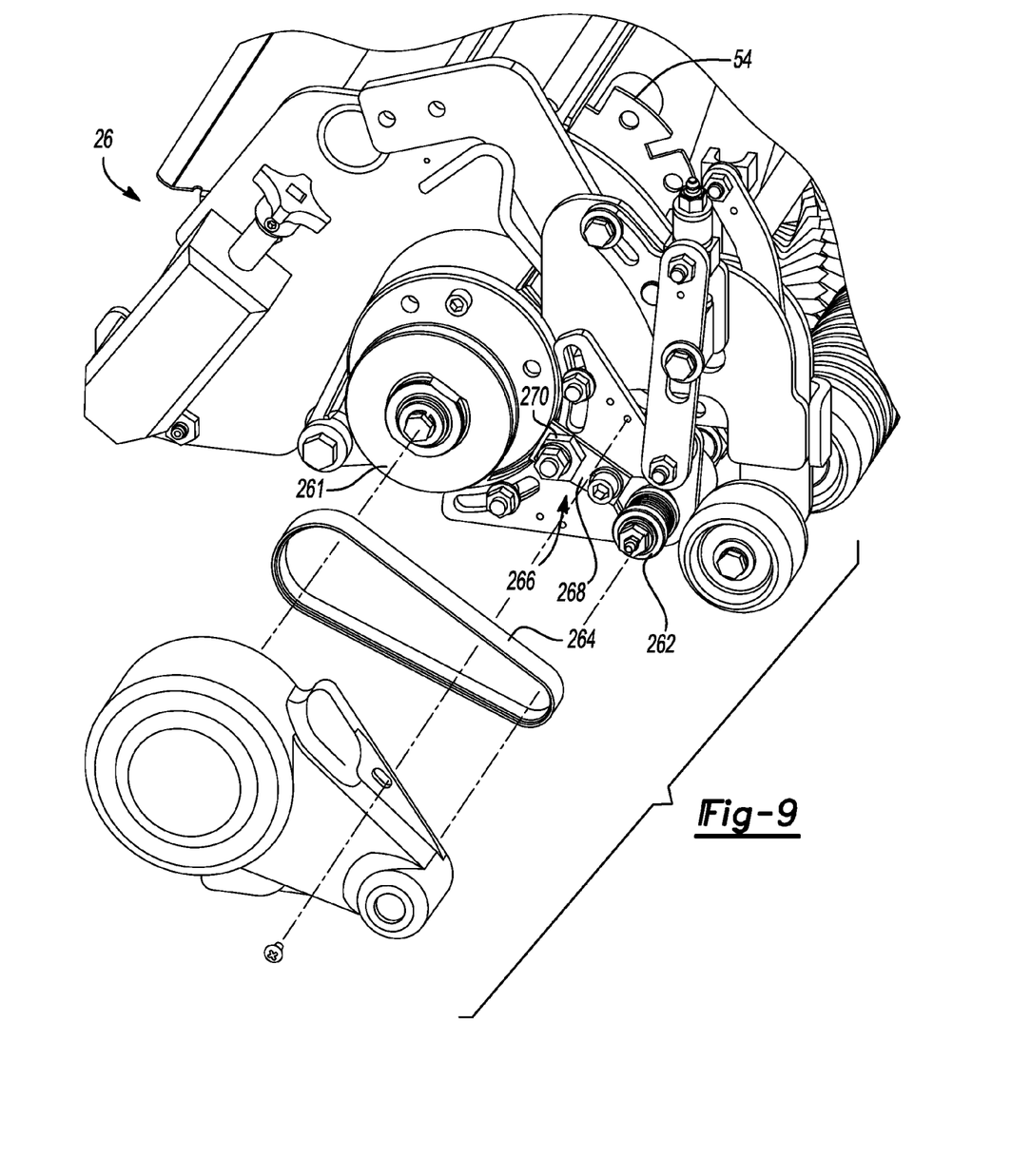
FIG. 9 is a partial exploded perspective view of a drive mechanism for a groomer of the cutting unit shown in FIG. 2.
Figure 10:
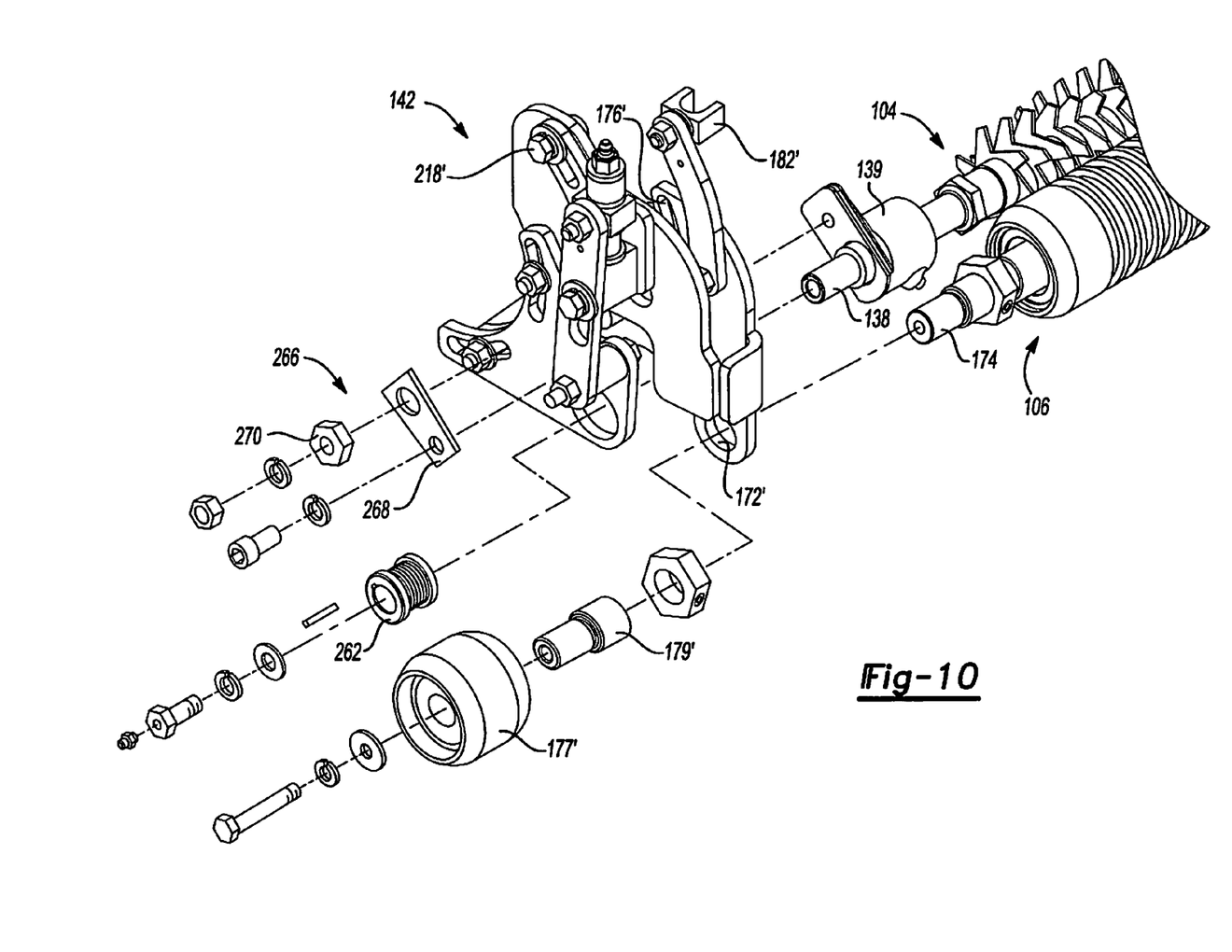
FIG. 10 is another partial exploded perspective view showing the drive mechanism for the groomer.

Groomer plate 154 includes an aperture 258 in receipt of driveshaft 138 of groomer 104. Driveshaft 138 may be driven from either end depending on a desired location of a power transmission path. FIGS. 9 and 10 depict a right hand drive assembly including a drive pulley 261 fixed to reel assembly 54 and a driven pulley 262 drivingly interconnected by a V-belt 264. A belt tensioning assembly 266 includes a tensioning bracket 268 and an eccentric cam 270. Rotation of cam 270 adjusts the tension on belt 264. Tensioning assembly 266, drive pulley 261, driven pulley 262 and V-belt 264 are configured to transfer a predetermined amount of torque to groomer driveshaft 138. If the groomer should possibly become incorrectly adjusted where a relatively deep groomer cut is being attempted, V-belt 264 will slip on one of the pulley surfaces to prevent possible misuse of and damage to the cutting unit.

The cutting unit of the present disclosure allows an operator to set a desired height of cut by moving the reel assembly relative to the ground. A depth of cut of a groomer may be set independently from the height of cut setting. However, the position of the groomer will be limited such that the bottom most cutting point of the groomer extends a maximum of one-half of the distance of the height of cut where the depth of groomer cut is measured from the cutting edge of the bed plate in a direction toward the turf. The arrangement of the present disclosure protects the turf from undesirably deep vertical cuts while growth points are generated, turf is thickened and the grass is encouraged to grow in a vertical direction.

While the cutting units previously described are shown mounted on a riding mower, it should be appreciated that the structures and inventive concepts presented may be applied to other mowers such as walk-behind mowers. Further, one skilled in the art will recognize that various other embodiments could include other grounds maintenance implements where it is generally desired to displace the implement to effect an adjustment.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A turf cutting unit comprising:
a frame;
a reel assembly mounted to the frame and having a plurality of blades rotatable about a reel axis extending substantially parallel to the ground;
a rotatably driven groomer including a plurality of spaced apart and substantially vertically oriented cutting plates; and
an adjustment assembly connected to the frame and operable to move the reel assembly relative to the turf to set a turf cutting height, the adjustment assembly having a roller bracket including an outboard plate, an inboard plate and a push plate fastenably and rotatably connected to the inboard plate, the outboard plate having an elongated slot extending along an arc having a center aligned with the reel axis, the slot guiding movement to adjust the position of the cutting plates to set a depth of cut that the groomer cutting plates engage the turf, the adjustment assembly including an adjustment mechanism, the adjustment mechanism limiting a maximum depth of cut of the groomer cutting plates based on the cutting height of the reel assembly;
a groomer plate is selectively moved relative to the outboard plate during the depth of cut adjustment of the groomer cutting plates, an amount of relative movement between the groomer plate and the outboard plate is limited to define the magnitude of the depth of cut; and
the adjustment assembly having a link including a second elongated slot enabling relative movement between the groomer plate and the outboard plate, a length of the second elongated slot determining the amount of relative movement between the groomer plate and the outboard plate.

2. The turf cutting unit of claim 1 further including a bed knife having a cutting edge positioned adjacent the reel assembly and ground engaging rollers supporting the frame, wherein the cutting height is defined as a minimum distance between the cutting edge of the bed knife and a plane defined by the ground engaging rollers.

3. The turf cutting unit of claim 2 wherein the depth of cut of the groomer cutting plates is defined as a distance from the cutting edge of the bed knife to a tangent point of the cutting plates closest the turf.

4. The turf cutting unit of claim 3 wherein the depth of cut of the groomer cutting plates is adjustable from zero to one-half the cutting height.

5. The turf cutting unit of claim 1 wherein the adjustment assembly is pivotally coupled to the reel assembly, wherein relative movement between the outboard plate and the reel assembly adjusts the turf cutting height.

6. The turf cutting unit of claim 1 further including a pin extending through a slot in the groomer plate.

7. The turf cutting unit of claim 1 wherein the groomer plate rotatably supports the groomer.

8. The turf cutting unit of claim 2 wherein the outboard plate rotatably supports one of the ground engaging rollers.

* * * * *